US008584944B2

(12) United States Patent
White et al.

(10) Patent No.: US 8,584,944 B2
(45) Date of Patent: Nov. 19, 2013

(54) FIELD DENSITY ALTITUDE COMPENSATOR APPARATUS, KIT, AND METHOD

(76) Inventors: Taylor A. White, Stafford, VA (US); Christopher M. Sharon, Stafford, VA (US)

( * ) Notice: Subject to any disclaimer, the term of this patent is extended or adjusted under 35 U.S.C. 154(b) by 413 days.

(21) Appl. No.: 12/896,226

(22) Filed: Oct. 1, 2010

(65) Prior Publication Data

US 2012/0132708 A1 May 31, 2012

Related U.S. Application Data

(60) Provisional application No. 61/296,328, filed on Jan. 19, 2010.

(51) Int. Cl.
*G06F 19/00* (2011.01)

(52) U.S. Cl.
USPC ............................ 235/406; 235/380; 235/400

(58) Field of Classification Search
USPC ............................ 235/380, 400, 406; 42/119
See application file for complete search history.

(56) References Cited

U.S. PATENT DOCUMENTS 3,533,551 A 10/1970 Cole et al.
3,627,199 A 12/1971 Hill et al.
3,747,847 A 7/1973 Cohen
4,121,759 A 10/1978 Merkel et al.
4,308,450 A 12/1981 Ausman et al.
4,311,902 A 1/1982 Koll
5,960,576 A * 10/1999 Robinson .......................... 42/90
6,196,455 B1 3/2001 Robinson
7,162,825 B2 1/2007 Ugolini et al.
7,310,904 B2 12/2007 Ugolini et al.
7,325,353 B2 * 2/2008 Cole et al. ....................... 42/119
7,748,155 B2 7/2010 Cole

* cited by examiner

*Primary Examiner* — Daniel Hess
*Assistant Examiner* — Rafferty Kelly
(74) *Attorney, Agent, or Firm* — Law Office of Peter G. Korytnyk, PLLC

(57) ABSTRACT

An apparatus, a kit, and a method of use thereof for assisting snipers or long-range shooters in arriving at a firing solution for adjustment of an aiming system are provided. The apparatus can include a housing including a viewing area and a slide including a matrix of firing solutions printed thereon based on a plurality of density altitude values. The slide is movable with respect to the housing such that a portion of the matrix of firing solutions is viewable in the viewing area of the housing based on a density altitude value. This allows a user to adjust the trajectory compensation of a telescopic sight or any other aiming system by using the current measured density altitude.

27 Claims, 5 Drawing Sheets

72 74 76 78 80

.308 WIN / 175 SMK @ 2600 FPS / MOA

MOA

| -3k | | -2k | | -1k | | 0 | | +1k | | +2k | | +3k | | +4k | | +5k | | +6k | | +7k | | +8k | | +9k | | +10k | |
|---|---|---|---|---|---|---|---|---|---|---|---|---|---|---|---|---|---|---|---|---|---|---|---|---|---|---|---|
| Drop | Wind | Drop | Wind | Drop | Wind | Drop | Wind | Drop | Wind | Drop | Wind | Drop | Wind | Drop | Wind | Drop | Wind | Drop | Wind | Drop | Wind | Drop | Wind | Drop | Wind | Drop | Wind |
| 0 | 0 | 0 | 0 | 0 | 0 | 0 | 0 | 0 | 0 | 0 | 0.3 | 0 | 0.3 | 0 | 0.3 | 0 | 0.3 | 0 | 0.3 | 0 | 0.3 | 0 | 0.3 | 0 | 0.3 | 0 | 0.3 |
| -0.8 | 0.6 | -0.8 | 0.6 | -0.8 | 0.6 | -0.8 | 0.6 | -0.8 | 0.5 | -0.8 | 0.5 | -0.8 | 0.5 | -0.8 | 0.5 | -0.8 | 0.5 | -0.8 | 0.5 | -0.8 | 0.5 | -0.8 | 0.4 | -0.8 | 0.4 | -0.8 | 0.4 |
| -2 | 0.8 | -2 | 0.8 | -2 | 0.8 | -2 | 0.7 | -2 | 0.7 | -2 | 0.7 | -2 | 0.7 | -2 | 0.7 | -2.7 | 0.7 | -1.9 | 0.7 | -1.9 | 0.6 | -1.9 | 0.6 | -1.9 | 0.6 | -1.9 | 0.5 |
| -3.4 | 1 | -3.4 | 1 | -3.4 | 1 | -3.4 | 1 | -3.4 | .9 | -3.3 | 0.9 | -3.3 | 0.9 | -3.3 | 0.9 | -3.3 | 0.8 | -3.3 | 0.8 | -3.3 | 0.8 | -3.2 | 0.7 | -3.2 | 0.7 | -3.2 | 0.7 |
| -5 | 1.3 | -4.9 | 1.2 | -4.9 | 1.2 | -4.9 | 1.2 | -4.9 | 1.1 | -4.8 | 1.1 | -4.8 | 1.1 | 4.8 | 1 | 4.8 | 1 | 4.7 | 1 | 4.7 | 1 | 4.6 | 0.9 | 4.6 | 0.9 | 4.6 | 0.7 |
| -6.7 | 1.5 | -6.6 | 1.5 | -6.6 | 1.4 | -6.5 | 1.4 | -6.5 | 1.3 | -6.4 | 1.3 | -6.4 | 1.3 | 6.4 | 1.2 | 6.4 | 1.2 | 6.2 | 1.2 | 6.2 | 1.2 | 6.2 | 1.1 | 6.1 | 1 | 6.1 | 1 |
| -8.4 | 1.7 | -8.4 | 1.7 | -8.3 | 1.7 | -8.3 | 1.6 | -8.2 | 1.6 | -8.1 | 1.5 | -8.1 | 1.5 | -8 | 1.4 | -8 | 1.4 | -7.9 | 1.3 | -7.9 | 1.3 | -7.8 | 1.2 | -7.7 | 1.2 | -7.6 | 1.2 |
| -10.4 | 2 | -10.3 | 2 | -10.2 | 1.9 | -10.1 | 1.9 | -10 | 1.8 | -10 | 1.8 | -9.9 | 1.7 | -9.7 | 1.6 | -9.7 | 1.6 | -9.6 | 1.5 | -9.6 | 1.5 | -9.4 | 1.4 | -9.4 | 1.4 | -9.3 | 1.3 |
| -12.4 | 2.3 | -12.3 | 2.2 | -12.2 | 2.2 | -12.1 | 2.1 | -12 | 2 | -11 | 2 | -11.8 | 1.9 | -11.6 | 1.9 | -11.6 | 1.8 | -11.4 | 1.7 | -11.3 | 1.7 | -11.2 | 1.6 | -11.1 | 1.5 | -11 | 1.5 |
| -14.6 | 2.6 | -14.5 | 2.5 | -14.4 | 2.4 | -14.2 | 2.4 | -14.1 | 2.3 | -14 | 2.2 | -13.8 | 2.2 | -13.5 | 2.1 | -13.5 | 2 | -13.4 | 1.9 | -13.2 | 1.9 | -13.1 | 1.8 | -12.9 | 1.7 | -12.8 | 1.7 |
| -17 | 2.9 | -16.8 | 2.8 | -16.6 | 2.7 | -16.5 | 2.6 | -16.3 | 2.6 | -16.1 | 2.5 | -16 | 2.4 | -15.6 | 2.3 | -15.6 | 2.2 | -15.2 | 2.2 | -15.2 | 2.1 | -15 | 2 | -14.9 | 1.9 | -14.7 | 1.8 |
| -19.5 | 3.2 | -19.3 | 3.1 | -19.1 | 3 | -19.9 | 2.9 | -18.6 | 2.8 | -18.4 | 2.8 | -18.2 | 2.7 | -18 | 2.6 | -17.8 | 2.5 | -17.6 | 2.4 | -17.3 | 2.3 | -17.1 | 2.2 | -16.9 | 2.1 | -16.7 | 2 |
| -22.2 | 3.5 | -22 | 3.4 | -21.7 | 3.3 | -21.4 | 3.2 | -21.1 | 3.1 | -20.9 | 3 | -20.7 | 2.9 | -20.4 | 2.8 | -20.1 | 2.7 | 19.8 | 2.6 | -19.5 | 2.5 | -19.2 | 2.4 | -19 | 2.3 | -18.8 | 2.2 |
| 25.2 | 3.9 | 24.8 | 3.8 | 24.5 | 3.6 | 24.1 | 3.5 | 23.8 | 3.4 | 23.5 | 3.3 | 23.2 | 3.2 | -22.5 | 3.1 | -22.5 | 3 | -22.8 | 2.8 | -21.8 | 2.7 | -21.5 | 2.6 | -21.2 | 2.5 | -20.9 | 2.4 |
| 28.3 | 4.2 | 27.9 | 4.1 | 27.5 | 4 | 27.1 | 3.9 | 26.7 | 3.7 | 26.3 | 3.6 | 25.9 | 3.4 | -25.7 | 3.4 | -25.1 | 3.2 | -24.7 | 3.1 | -24.3 | 3 | -23.9 | 2.8 | -23.5 | 2.7 | -23.2 | 2.6 |
| -30 | 4.4 | -29.5 | 4.3 | -29 | 4.2 | -28.6 | 4 | -28.2 | 3.9 | -27.8 | 3.8 | -27.4 | 3.7 | -26.9 | 3.5 | -26.4 | 3.4 | -26 | 3.2 | -25.5 | 3.1 | -25.1 | 3 | -24.7 | 2.8 | -24.4 | 2.7 |
| -31.7 | 4.6 | -31.2 | 4.5 | -30.1 | 4.3 | -30.2 | 4.2 | -29.7 | 4.1 | -29.3 | 3.9 | -28.9 | 3.8 | -28.8 | 3.7 | -28.8 | 3.5 | -27.3 | 3.4 | -26.8 | 3.2 | -26.4 | 3.1 | -26 | 3 | -25.6 | 2.8 |
| -33.5 | 4.8 | -32.9 | 4.7 | -32.4 | 4.5 | -32.8 | 4.4 | -31.3 | 4.2 | -30.8 | 4.1 | -30.4 | 4 | -29.3 | 3.8 | -29.3 | 3.7 | -28.7 | 3.5 | -28.2 | 3.3 | -27.7 | 3.2 | -27.2 | 3.1 | -26.8 | 2.9 |
| -35.3 | 5 | -34.7 | 4.1 | -34.1 | 4.7 | -34.5 | 4.6 | -33 | 4.4 | -32.5 | 4.3 | -32 | 4.1 | -31.3 | 4 | -31.7 | 3.8 | -30.1 | 3.6 | -29.6 | 3.5 | -29 | 3.3 | -28.5 | 3.2 | -28.1 | 3 |
| -37.3 | 5.3 | -36.6 | 5.1 | -35.9 | 4.9 | -35.9 | 4.8 | -34.7 | 4.6 | -34.1 | 4.5 | -33.3 | 4.3 | -32.9 | 4.1 | -32.2 | 4 | -31.6 | 3.8 | -31 | 3.6 | -30.4 | 3.5 | -29.9 | 3.3 | -29.4 | 3.2 |
| **-39.3** | **5.5** | **-38.6** | 5.3 | -37.8 | 5.1 | -37.8 | 5 | -36.5 | 4.8 | -35.9 | 4.6 | -35.3 | 4.5 | 34.5 | 4.3 | 34.8 | 4.1 | +33.1 | 3.9 | 32.4 | 3.7 | 31.8 | 3.6 | 31.2 | 3.4 | 30.7 | 3.3 |
| **-41.4** | **5.7** | **-40.6** | **5.5** | **-39.8** | **5.3** | **-39.8** | 5.2 | 38.3 | 5 | 37.7 | 4.8 | 37 | 4.7 | 35.2 | 4.5 | 35.4 | 4.3 | 34.6 | 4.1 | 33.9 | 4.1 | 33.3 | 3.7 | 33.6 | 3.5 | 32 | 3.4 |
| **-43.6** | **5.9** | **-42.7** | **5.7** | **-41.9** | **5.5** | **-41.9** | **5.4** | **-40.3** | **5.2** | **-39.5** | **5** | **-38.8** | **4.8** | -37.9 | 4.6 | -37.1 | 4.4 | -36.2 | 4.2 | -35.5 | 4 | -34.8 | 3.8 | -34.1 | 3.7 | -33.4 | 3.5 |

306-175-2600

64

Fig. 2C 72 76 78 80

.308 WIN / 175 SMK @ 2600 FPS / 0.1 MRAD 0.1 MRAD

| -3k | | -2k | | -1k | | 0 | | +1k | | +2k | | +3k | | +4k | | +5k | | +6k | | +7k | | +8k | | +9k | | +10k | |
|---|---|---|---|---|---|---|---|---|---|---|---|---|---|---|---|---|---|---|---|---|---|---|---|---|---|---|---|
| Drop | Wind | Drop | Wind | Drop | Wind | Drop | Wind | Drop | Wind | Drop | Wind | Drop | Wind | Drop | Wind | Drop | Wind | Drop | Wind | Drop | Wind | Drop | Wind | Drop | Wind | Drop | Wind |
| 0 | 0.1 | 0 | 0.1 | 0 | 0.1 | 0 | 0.1 | 0 | 0.1 | 0 | 0.1 | 0 | 0.1 | 0 | 0.1 | 0 | 0.1 | 0 | 0.1 | 0 | 0.1 | 0 | 0.1 | 0 | 0.1 | 0 | 0.1 |
| -0.2 | 0.2 | -0.2 | 0.2 | -0.2 | 0.2 | -0.2 | 0.2 | -0.2 | 0.2 | -0.2 | 0.2 | -0.2 | 0.2 | 0.2 | 0.1 | 0.2 | 0.1 | 0.2 | 0.1 | 0.2 | 0.1 | 0.2 | 0.1 | 0.2 | 0.1 | 0.2 | 0.1 |
| -.06 | 0.2 | -.06 | 0.2 | -.06 | 0.2 | -.06 | 0.2 | -0.6 | 0.2 | -.06 | 0.2 | -.06 | 0.2 | 0.8 | 0.2 | 0.6 | 0.2 | .06 | 0.2 | .06 | 0.2 | .06 | 0.2 | .06 | 0.2 | .06 | 0.2 |
| 1 | 0.3 | 1 | 0.3 | 1 | 0.3 | 1 | 0.3 | 1 | 0.3 | 1 | 0.3 | 1 | 0.3 | 1 | 0.2 | 1 | 0.2 | .09 | 0.2 | .09 | 0.2 | .09 | 0.2 | .09 | 0.2 | .09 | 0.2 |
| -1.4 | 0.4 | -1.4 | 0.4 | -1.4 | 0.3 | -1.4 | 0.3 | -1.4 | 0.3 | -1.4 | 0.3 | -1.4 | 0.3 | -1.4 | 0.3 | -1.4 | 0.3 | -1.4 | 0.3 | -1.4 | 0.3 | -1.3 | 0.3 | -1.3 | 0.3 | -1.3 | 0.2 |
| -1.9 | 0.4 | -1.9 | 0.4 | -1.9 | 0.4 | -1.9 | 0.4 | -1.9 | 0.4 | -1.9 | 0.4 | -1.9 | 0.4 | -1.8 | 0.4 | -1.8 | 0.3 | -1.8 | 0.3 | -1.8 | 0.3 | -1.8 | 0.3 | -1.8 | 0.3 | -1.8 | 0.3 |
| -2.5 | 0.5 | -2.5 | 0.5 | -2.4 | 0.5 | -2.4 | 0.5 | -2.4 | 0.5 | -2.4 | 0.4 | -2.4 | 0.4 | -23 | 0.4 | -2.3 | 0.4 | -2.3 | 0.4 | -2.3 | 0.4 | -2.2 | 0.3 | -2.2 | 0.3 | -2.2 | 0.3 |
| -3 | 0.6 | -3 | 0.6 | -3 | 0.6 | -2.9 | 0.5 | -2.9 | 0.5 | -2.9 | 0.5 | -2.9 | 0.5 | -2.8 | 0.5 | -2.8 | 0.5 | -2.8 | 0.4 | -2.8 | 0.4 | -2.7 | 0.4 | -2.7 | 0.5 | -2.7 | 0.4 |
| -3.6 | 0.7 | -3.6 | 0.6 | -3.6 | 0.6 | -3.5 | 0.6 | -3.5 | 0.6 | -3.5 | 0.6 | -3.4 | 0.6 | -3.4 | 0.5 | -3.4 | 0.5 | -3.3 | 0.5 | -3.3 | 0.5 | -3.2 | 0.5 | -3.2 | 0.5 | -3.2 | 0.4 |
| -4.3 | 0.7 | -4.3 | 0.7 | -4.2 | 0.7 | -4.1 | 0.7 | -4.1 | 0.7 | -4.1 | 0.6 | -4 | 0.6 | -4 | 0.6 | -3.9 | 0.6 | -3.9 | 0.6 | -3.8 | 0.5 | -3.8 | 0.5 | -3.8 | 0.6 | -3.7 | 0.5 |
| -4.9 | 0.8 | -4.2 | 0.8 | -4.8 | 0.8 | -4.8 | 0.8 | -4.7 | 0.7 | -4.7 | 0.7 | -4.6 | 0.7 | 4.6 | 0.7 | 4.5 | 0.7 | 4.5 | 0.6 | 4.4 | 0.5 | 4.3 | 0.6 | 4.3 | 0.6 | 4.3 | 0.5 |
| 5.7 | 0.9 | 4.2 | 0.9 | 5.5 | 0.9 | 5.5 | 0.8 | 5.4 | 0.8 | 5.4 | 0.8 | 5.3 | 0.8 | -5.2 | 0.7 | -5.2 | 0.7 | -5.1 | 0.7 | -5 | 0.6 | -4.9 | 0.6 | -4.9 | 0.7 | -4.9 | 0.6 |
| -6.5 | 1 | -5.6 | 1 | -6.3 | 1 | -6.2 | 0.9 | -6.2 | 0.9 | -6.1 | 0.9 | -6 | .09 | -5.9 | 0.8 | -5.8 | 0.8 | -5.8 | 0.8 | -5.7 | 0.7 | -5.5 | 0.7 | -5.5 | 0.7 | -5.5 | 0.6 |
| -7.3 | 1.1 | -6.4 | 1.1 | -7.1 | 1.1 | -7 | 1 | -6.9 | 1 | -6.8 | 1 | -6.8 | 0.9 | -6.6 | 0.9 | -6.5 | 0.9 | -6.4 | 0.8 | -6.3 | 0.7 | -6.2 | 0.7 | -6.2 | 0.8 | -6.1 | 0.7 |
| -8.2 | 1.2 | -7.2 | 1.2 | -8 | 1.2 | -7.9 | 1.1 | -7.8 | 1.1 | -7.7 | 1.1 | -7.5 | 1 | -7.4 | 1 | -7.3 | 0.9 | -7.2 | 0.9 | -7.1 | 0.8 | -6.8 | 0.8 | -6.8 | 0.8 | -6.7 | 0.8 |
| -8.7 | 1.3 | -8.1 | 1.2 | -8.4 | 1.2 | -8.3 | 1.2 | -8.2 | 1.1 | -8.1 | 1.1 | -8 | 1.1 | -7.8 | 1 | -7.7 | 1 | -7.8 | 0.9 | -7.4 | 0.9 | -7.2 | 0.8 | -7.2 | 0.9 | -7.1 | 0.8 |
| -9.2 | 1.3 | -8.6 | 1.3 | -8.9 | 1.3 | -8.8 | 1.2 | -8.6 | 1.2 | -8.5 | 1.1 | -8.4 | 1.1 | -8.2 | 1.1 | -8.1 | 1 | -7.9 | 1 | -7.8 | 0.9 | -7.6 | 0.9 | -7.6 | 0.9 | -7.4 | 0.8 |
| -9.7 | 1.4 | -9.1 | 1.4 | -8.4 | 1.3 | -9.3 | 1.3 | -9.1 | 1.2 | -9 | 1.2 | -8.8 | 1.2 | -8.7 | 1.1 | -8.5 | 1.1 | -8.3 | 1 | -8.2 | 0.9 | -7.9 | 0.9 | -7.9 | 0.9 | -7.8 | 0.9 |
| 10.3 | 1.5 | 9.6 | 1.4 | 8.9 | 1.4 | 9.8 | 1.3 | 9.6 | 1.3 | 9.4 | 1.2 | 9.3 | 1.2 | 9.1 | 1.2 | 8.9 | 1.1 | 8.8 | 1.1 | 8.6 | 1 | 8.3 | 0.9 | 8.3 | 1 | 8.2 | 0.9 |
| 10.8 | 1.5 | 10.6 | 1.5 | 9.4 | 1.4 | 10.3 | 1.4 | 10.1 | 1.3 | 9.9 | 1.3 | 9.8 | 1.3 | -9.6 | 1.2 | -9.4 | 1.2 | -9.2 | 1.1 | -9 | 1 | -8.7 | 1 | -8.7 | 1 | -8.5 | 0.9 |
| **-11.4** | **1.6** | **-11.2** | 1.6 | 9.9 | 1.5 | 10.8 | 1.4 | 10.6 | 1.4 | 10.4 | 1.3 | 10.3 | 1.3 | -10 | 1.2 | -9.8 | 1.2 | -9.6 | 1.1 | -9.4 | 1.1 | -9.1 | 1 | -9.1 | 1 | -8.9 | 1 |
| **-12** | **1.7** | **-11.6** | **1.6** | **-10.5** | **1.6** | **-11.4** | **1.5** | -11.2 | 1.4 | -11 | 1.4 | -10.6 | 1.4 | -10.5 | 1.3 | -10.3 | 1.2 | -10.1 | 1.2 | -9.9 | 1.1 | -9.5 | 1 | -9.5 | 1.1 | -9.3 | 1 |
| **-12.7** | **1.7** | **-12.4** | **1.7** | **-12.2** | **1.6** | **-11.9** | **1.6** | **-11.7** | **1.5** | **-11.5** | **1.5** | **-11.3** | **1.4** | -11 | 1.3 | -10.6 | 1.3 | -10.3 | 1.2 | -10.3 | 1.2 | -9.9 | 1.1 | -9.9 | 1.1 | -9.7 | 1 |

308 1/5 2600

64

Fig. 2D 174 174

.300 WM / 190 SMK @ 2950 FPS / 0.1 MRAD / METERS

MRAD / METERS

| 2k | | | | | | 0 | | | | | | +2k | | | | | | +4k | | | | | | +6k | | | | | |
|---|---|---|---|---|---|---|---|---|---|---|---|---|---|---|---|---|---|---|---|---|---|---|---|---|---|---|---|---|---|
| 0 | 0 | 0.1 | 0.1 | 0 | 0.5 | 0 | 0 | 0.1 | 0.1 | 0 | 0.5 | 0 | 0 | 0.1 | 0.1 | 0 | 0.5 | 0 | 0 | 0.1 | 0.1 | 0 | 0.5 | 0 | 0 | 0.1 | 0.1 | 0 | 0.5 |
| -0.4 | -.04 | -0.3 | 0.2 | 0 | 0.5 | -0.4 | -.04 | -0.3 | 0.2 | 0 | 0.5 | -0.4 | -.04 | -0.3 | 0.2 | 0 | 0.5 | -0.4 | -.04 | -0.3 | 0.2 | 0 | 0.5 | -0.4 | -.04 | -0.3 | 0.2 | 0 | 0.5 |
| -1.1 | -1.1 | -0.9 | -0.8 | 0.1 | 0.6 | -1.1 | -1.1 | -0.9 | -0.8 | 0.1 | 0.6 | -1.1 | -1.1 | -0.9 | -0.8 | 0.1 | 0.6 | -1.1 | -1.1 | -0.9 | -0.8 | 0.1 | 0.6 | -1.1 | -1.1 | -0.9 | -0.8 | 0.1 | 0.6 |
| -2 | -1.9 | -1.7 | -1.4 | 0.1 | 0.6 | -2 | -1.9 | -1.7 | -1.4 | 0.1 | 0.6 | -2 | -1.9 | -1.7 | -1.4 | 0.1 | 0.6 | -2 | -1.9 | -1.7 | -1.4 | 0.1 | 0.6 | -2 | -1.9 | -1.7 | -1.4 | 0.1 | 0.6 |
| -2.9 | -2.7 | -2.5 | -2.2 | 0.1 | 0.6 | -2.9 | -2.7 | -2.5 | -2.2 | 0.1 | 0.6 | -2.9 | -2.7 | -2.5 | -2.2 | 0.1 | 0.6 | -2.9 | -2.7 | -2.5 | -2.2 | 0.1 | 0.6 | -2.9 | -2.7 | -2.5 | -2.2 | 0.1 | 0.6 |
| 3.9 | 3.8 | 3.5 | 3 | 0.1 | 0.6 | 3.9 | 3.8 | 3.5 | 3 | 0.1 | 0.6 | 3.9 | 3.8 | 3.5 | 3 | 0.1 | 0.6 | 3.9 | 3.8 | 3.5 | 3 | 0.1 | 0.6 | 3.9 | 3.8 | 3.5 | 3 | 0.1 | 0.6 |
| -5.1 | -4.9 | -4.5 | -4 | 0.2 | 0.7 | -5.1 | -4.9 | -4.5 | -4 | 0.2 | 0.7 | -5.1 | -4.9 | -4.5 | -4 | 0.2 | 0.7 | -5.1 | -4.9 | -4.5 | -4 | 0.2 | 0.7 | -5.1 | -4.9 | -4.5 | -4 | 0.2 | 0.7 |
| -5.8 | -5.5 | -5.1 | -4.5 | 0.2 | 0.7 | -5.8 | -5.5 | -5.1 | -4.5 | 0.2 | 0.7 | -5.8 | -5.5 | -5.1 | -4.5 | 0.2 | 0.7 | -5.6 | -5.5 | -5.1 | -4.5 | 0.2 | 0.7 | -5.8 | -5.5 | -5.1 | -4.5 | 0.2 | 0.7 |
| -6.5 | -6.2 | -5.7 | -5.1 | 0.2 | 0.7 | -6.5 | -6.2 | -5.7 | -5.1 | 0.2 | 0.7 | -6.5 | -6.2 | -5.7 | -5.1 | 0.2 | 0.7 | -6.5 | -6.2 | -5.7 | -5.1 | 0.2 | 0.7 | -6.5 | -6.2 | -5.7 | -5.1 | 0.2 | 0.7 |
| 7.2 | 6.9 | 6.4 | 5.7 | 0.2 | 0.7 | 7.2 | 6.9 | 6.4 | 5.7 | 0.2 | 0.7 | 7.2 | 6.9 | 6.4 | 5.7 | 0.2 | 0.7 | 7.2 | 6.9 | 6.4 | 5.7 | 0.2 | 0.7 | 7.2 | 6.9 | 6.4 | 5.7 | 0.2 | 0.7 |
| -8 | -7.7 | -7.1 | -6.3 | 0.2 | 0.7 | -8 | -7.7 | -7.1 | -6.3 | 0.2 | 0.7 | -8 | -7.7 | -7.1 | -6.3 | 0.2 | 0.7 | -8 | -7.7 | -7.1 | -6.3 | 0.2 | 0.7 | -8 | -7.7 | -7.1 | -6.3 | 0.2 | 0.7 |
| -8.9 | -8.5 | -7.9 | -7 | 0.2 | 0.7 | -8.9 | -8.5 | -7.9 | -7 | 0.2 | 0.7 | -8.9 | -8.5 | -7.9 | -7 | 0.2 | 0.7 | -8.9 | -8.5 | -7.9 | -7 | 0.2 | 0.7 | -8.9 | -8.5 | -7.9 | -7 | 0.2 | 0.7 |
| -9.8 | -9.4 | -8.7 | -7.7 | 0.3 | 0.8 | -9.8 | -9.4 | -8.7 | -7.7 | 0.3 | 0.8 | -9.8 | -9.4 | -8.7 | -7.7 | 0.3 | 0.8 | -9.8 | -9.4 | -8.7 | -7.7 | 0.3 | 0.8 | -9.8 | -9.4 | -8.7 | -7.7 | 0.3 | 0.8 |
| 10.6 | 10.3 | 9.5 | 8.5 | 0.3 | 0.8 | 10.6 | 10.3 | 9.5 | 8.5 | 0.3 | 0.8 | 10.8 | 10.3 | 9.5 | 8.5 | 0.3 | 0.8 | 10.8 | 10.3 | 9.5 | 8.5 | 0.3 | 0.8 | 10.6 | 10.3 | 9.5 | 6.5 | 0.3 | 0.6 |
| -11.6 | -11.3 | -10.5 | -9.3 | 0.3 | 0.8 | -11.6 | -11.3 | -10.5 | -9.3 | 0.3 | 0.8 | -11.8 | -11.3 | -10.5 | -9.3 | 0.3 | 0.8 | -11.8 | -11.3 | -10.5 | -9.3 | 0.3 | 0.8 | -11.6 | -11.3 | -10.5 | -9.3 | 0.3 | 0.6 |
| -13 | -12.4 | -11.5 | -10.2 | 0.3 | 0.8 | -13 | -12.4 | -11.5 | -10.2 | 0.3 | 0.8 | -13 | -12.4 | -11.5 | -10.2 | 0.3 | 0.8 | -13 | -12.4 | -11.5 | -10.2 | 0.3 | 0.8 | -13 | -12.4 | -11.5 | -10.2 | 0.3 | 0.8 |
| -14.2 | -13.5 | -12.6 | -11.2 | 0.3 | 0.8 | -14.2 | -13.5 | -12.6 | -11.2 | 0.3 | 0.8 | -14.2 | -13.5 | -12.6 | -11.2 | 0.3 | 0.8 | -14.2 | -13.5 | -12.6 | -11.2 | 0.3 | 0.8 | -14.2 | -13.5 | -12.6 | -11.2 | 0.3 | 0.8 |
| -15.6 | -14.8 | -13.7 | -12.2 | 0.4 | 0.9 | -15.6 | -14.8 | -13.7 | -12.2 | 0.4 | 0.9 | -15.6 | -14.8 | -13.7 | -12.2 | 0.4 | 0.9 | -15.6 | -14.8 | -13.7 | -12.2 | 0.4 | 0.9 | -15.6 | -14.8 | -13.7 | -12.2 | 0.4 | 0.9 |
| -17 | -16.2 | -15 | -13.3 | 0.4 | 0.9 | -17 | -16.2 | -15 | -13.3 | 0.4 | 0.9 | -17 | -16.2 | -15 | -13.3 | 0.4 | 0.9 | -17 | -16.2 | -15 | -13.3 | 0.4 | 0.9 | -17 | -16.2 | -15 | -13.3 | 0.4 | 0.9 |
| -18.5 | -17.6 | -16.3 | -14.5 | 0.4 | 0.9 | -18.5 | -17.6 | -16.3 | -14.5 | 0.4 | 0.9 | -18.5 | -17.6 | -16.3 | -14.5 | 0.4 | 0.9 | -18.5 | -17.6 | -16.3 | -14.5 | 0.4 | 0.9 | -18.5 | -17.6 | -16.3 | -14.5 | 0.4 | 0.9 |
| -20.1 | -19.1 | -17.7 | -15.8 | 0.4 | 0.9 | 20.1 | 19.1 | 17.7 | 15.8 | 0.4 | 0.9 | 20.1 | 19.1 | 17.7 | 15.8 | 0.4 | 0.9 | 20.1 | 19.1 | 17.7 | 15.8 | 0.4 | 0.9 | 20.1 | 19.1 | 17.7 | 15.8 | 0.4 | 0.9 |
| -21.6 | -20.7 | -19.2 | -17.1 | 0.5 | 1 | -21.6 | -20.7 | -19.2 | -17.1 | 0.5 | 1 | -21.6 | -20.7 | -19.2 | -17.1 | 0.5 | 1 | -21.6 | -20.7 | -19.2 | -17.1 | 0.5 | 1 | -21.6 | -20.7 | -19.2 | -17.1 | 0.5 | 1 |
| -23.6 | -22.5 | -20.8 | -18.5 | 0.5 | 1 | -23.6 | -22.5 | -20.8 | -18.5 | 0.5 | 1 | -23.6 | -22.5 | -20.8 | -18.5 | 0.5 | 1 | -23.6 | -22.5 | -20.8 | -18.5 | 0.5 | 1 | -23.6 | -22.5 | -20.8 | -18.5 | 0.5 | 1 |

300WM-190-2950

164

Fig. 3C 174 174

.300 WM / 190 SMK @ 2950 FPS / 0.1 MRAD / METERS

MRAD / METERS

| +8k | | | | | | +10k | | | | | | +12k | | | | | | +14k | | | | | | +16k | | | | | |
|---|---|---|---|---|---|---|---|---|---|---|---|---|---|---|---|---|---|---|---|---|---|---|---|---|---|---|---|---|---|
| 0 | 0 | 0.1 | 0.1 | 0 | 0.5 | 0 | 0 | 0.1 | 0.1 | 0 | 0.5 | 0 | 0 | 0.1 | 0.1 | 0 | 0.5 | 0 | 0 | 0.1 | 0.1 | 0 | 0.5 | 0 | 0 | 0.1 | 0.1 | 0 | 0.5 |
| -0.4 | -.04 | -0.3 | 0.2 | 0 | 0.5 | -0.4 | -.04 | -0.3 | 0.2 | 0 | 0.5 | -0.4 | -.04 | -0.3 | 0.2 | 0 | 0.5 | -0.4 | -.04 | -0.3 | 0.2 | 0 | 0.5 | -0.4 | -.04 | -0.3 | 0.2 | 0 | 0.5 |
| 1.1 | 1 | 0.9 | 0.8 | 0.1 | 0.6 | 1.1 | 1.1 | 0.9 | 0.8 | 0.1 | 0.6 | 1.1 | 1.1 | 0.9 | 0.8 | 0.1 | 0.6 | 1.1 | 1.1 | 0.9 | 0.8 | 0.1 | 0.6 | 1.1 | 1.1 | 0.9 | 0.8 | 0.1 | 0.6 |
| -1.8 | -1.7 | -1.7 | -1.4 | 0.1 | 0.6 | -2 | -1.9 | -1.7 | -1.4 | 0.1 | 0.6 | -2 | -1.9 | -1.7 | -1.4 | 0.1 | 0.6 | -2 | -1.9 | -1.7 | -1.4 | 0.1 | 0.6 | -2 | -1.9 | -1.7 | -1.4 | 0.1 | 0.6 |
| -2.6 | -2.5 | -2.5 | -2.2 | 0.1 | 0.6 | -2.9 | -2.7 | -2.5 | -2.2 | 0.1 | 0.6 | -2.9 | -2.7 | -2.5 | -2.2 | 0.1 | 0.6 | -2.9 | -2.7 | -2.5 | -2.2 | 0.1 | 0.6 | -2.9 | -2.7 | -2.5 | -2.2 | 0.1 | 0.6 |
| -3.5 | -3.4 | -3.5 | -3 | 0.1 | 0.6 | -3.9 | -3.8 | -3.5 | -3 | 0.1 | 0.6 | -3.9 | -3.8 | -3.5 | -3 | 0.1 | 0.6 | -3.9 | -3.8 | -3.5 | -3 | 0.1 | 0.6 | -3.9 | -3.8 | -3.5 | -3 | 0.1 | 0.6 |
| 4.5 | 4.3 | 4.5 | 4 | 0.2 | 0.7 | 5.1 | 4.9 | 4.5 | 4 | 0.2 | 0.7 | 5.1 | 4.9 | 4.5 | 4 | 0.2 | 0.7 | 5.1 | 4.9 | 4.5 | 4 | 0.2 | 0.7 | 5.1 | 4.9 | 4.5 | 4 | 0.2 | 0.7 |
| -5.1 | -4.9 | -5.1 | -4.5 | 0.2 | 0.7 | -5.8 | -5.5 | -5.1 | -4.5 | 0.2 | 0.7 | -5.8 | -5.5 | -5.1 | -4.5 | 0.2 | 0.7 | -5.6 | -5.5 | -5.1 | -4.5 | 0.2 | 0.7 | -5.8 | -5.5 | -5.1 | -4.5 | 0.2 | 0.7 |
| -5.6 | -5.4 | -5.7 | -5.1 | 0.2 | 0.7 | -6.5 | -6.2 | -5.7 | -5.1 | 0.2 | 0.7 | -6.5 | -6.2 | -5.7 | -5.1 | 0.2 | 0.7 | -6.5 | -6.2 | -5.7 | -5.1 | 0.2 | 0.7 | -6.5 | -6.2 | -5.7 | -5.1 | 0.2 | 0.7 |
| -6.2 | -6 | -6.4 | -5.7 | 0.2 | 0.7 | -7.2 | -6.9 | -6.4 | -5.7 | 0.2 | 0.7 | -7.2 | -6.9 | -6.4 | -5.7 | 0.2 | 0.7 | -7.2 | -6.9 | -6.4 | -5.7 | 0.2 | 0.7 | -7.2 | -6.9 | -6.4 | -5.7 | 0.2 | 0.7 |
| -6.8 | -6.5 | -7.1 | -6.3 | 0.2 | 0.7 | -8 | -7.7 | -7.1 | -6.3 | 0.2 | 0.7 | -8 | -7.7 | -7.1 | -6.3 | 0.2 | 0.7 | -8 | -7.7 | -7.1 | -6.3 | 0.2 | 0.7 | -8 | -7.7 | -7.1 | -6.3 | 0.2 | 0.7 |
| -7.5 | -7.2 | -7.9 | -7 | 0.2 | 0.7 | -8.9 | -8.5 | -7.9 | -7 | 0.2 | 0.7 | -8.9 | -8.5 | -7.9 | -7 | 0.2 | 0.7 | -8.9 | -8.5 | -7.9 | -7 | 0.2 | 0.7 | -8.9 | -8.5 | -7.9 | -7 | 0.2 | 0.7 |
| -8.1 | -7.8 | -8.7 | -7.7 | 0.3 | 0.8 | -9.8 | -9.4 | -8.7 | -7.7 | 0.3 | 0.8 | -9.8 | -9.4 | -8.7 | -7.7 | 0.3 | 0.8 | -9.8 | -9.4 | -8.7 | -7.7 | 0.3 | 0.8 | -9.8 | -9.4 | -8.7 | -7.7 | 0.3 | 0.8 |
| 8.8 | 8.5 | 9.5 | 6.5 | 0.3 | 0.8 | 10.6 | 10.3 | 9.5 | 8.5 | 0.3 | 0.8 | 10.8 | 10.3 | 9.5 | 8.5 | 0.3 | 0.8 | 10.8 | 10.3 | 9.5 | 8.5 | 0.3 | 0.8 | 10.6 | 10.3 | 9.5 | 6.5 | 0.3 | 0.8 |
| -9.6 | -9.2 | -10.5 | -9.3 | 0.3 | 0.8 | -11.6 | -11.3 | -10.5 | -9.3 | 0.3 | 0.8 | -11.8 | -11.3 | -10.5 | -9.3 | 0.3 | 0.8 | -11.8 | -11.3 | -10.5 | -9.3 | 0.3 | 0.8 | -11.6 | -11.3 | -10.5 | -9.3 | 0.3 | 0.8 |
| -10.4 | -9.9 | -11.5 | -10.2 | 0.3 | 0.8 | -13 | -12.4 | -11.5 | -10.2 | 0.3 | 0.8 | -13 | -12.4 | -11.5 | -10.2 | 0.3 | 0.8 | -13 | -12.4 | -11.5 | -10.2 | 0.3 | 0.8 | -13 | -12.4 | -11.5 | -10.2 | 0.3 | 0.8 |
| -11.2 | -10.7 | -12.6 | -11.2 | 0.3 | 0.8 | -14.2 | -13.5 | -12.6 | -11.2 | 0.3 | 0.8 | -14.2 | -13.5 | -12.6 | -11.2 | 0.3 | 0.8 | -14.2 | -13.5 | -12.6 | -11.2 | 0.3 | 0.8 | -14.2 | -13.5 | -12.6 | -11.2 | 0.3 | 0.8 |
| 12.1 | 11.5 | 13.7 | 12.2 | 0.4 | 0.9 | 15.6 | 14.8 | 13.7 | 12.2 | 0.4 | 0.9 | 15.6 | 14.8 | 13.7 | 12.2 | 0.4 | 0.9 | 15.6 | 14.8 | 13.7 | 12.2 | 0.4 | 0.9 | 15.6 | 14.8 | 13.7 | 12.2 | 0.4 | 0.9 |
| -13 | -12.4 | -15 | -13.3 | 0.4 | 0.9 | -17 | -16.2 | -15 | -13.3 | 0.4 | 0.9 | -17 | -16.2 | -15 | -13.3 | 0.4 | 0.9 | -17 | -16.2 | -15 | -13.3 | 0.4 | 0.9 | -17 | -16.2 | -15 | -13.3 | 0.4 | 0.9 |
| -13.9 | -13.3 | -16.3 | -14.5 | 0.4 | 0.9 | -18.5 | -17.6 | -16.3 | -14.5 | 0.4 | 0.9 | -18.5 | -17.6 | -16.3 | -14.5 | 0.4 | 0.9 | -18.5 | -17.6 | -16.3 | -14.5 | 0.4 | 0.9 | -18.5 | -17.6 | -16.3 | -14.5 | 0.4 | 0.9 |
| -15 | -14.3 | -17.7 | -15.8 | 0.4 | 0.9 | -20.1 | -19.1 | -17.7 | -15.8 | 0.4 | 0.9 | -20.1 | -19.1 | -17.7 | -15.8 | 0.4 | 0.9 | -20.1 | -19.1 | -17.7 | -15.8 | 0.4 | 0.9 | -20.1 | -19.1 | -17.7 | -15.8 | 0.4 | 0.9 |
| -16.1 | 15.3 | 19.2 | 17.1 | 0.5 | 1 | 21.6 | 20.7 | 19.2 | 17.1 | 0.5 | 1 | 21.6 | 20.7 | 19.2 | 17.1 | 0.5 | 1 | 21.6 | 20.7 | 19.2 | 17.1 | 0.5 | 1 | 21.6 | 20.7 | 19.2 | 17.1 | 0.5 | 1 |
| -17.2 | -16.4 | -20.8 | -18.5 | 0.5 | 1 | -23.6 | -22.5 | -20.8 | -18.5 | 0.5 | 1 | -23.6 | -22.5 | -20.8 | -18.5 | 0.5 | 1 | -23.6 | -22.5 | -20.8 | -18.5 | 0.5 | 1 | -23.6 | -22.5 | -20.8 | -18.5 | 0.5 | 1 |

300WM-190-2950

164

Fig. 3D

FIELD DENSITY ALTITUDE COMPENSATOR APPARATUS, KIT, AND METHOD

CROSS REFERENCE TO RELATED APPLICATION

The present application claims the benefit from earlier filed U.S. Provisional Patent Application No. 61/296,328, filed Jan. 19, 2010, which is incorporated herein in its entirety by reference.

FIELD OF THE INVENTION

The present teachings relate to an apparatus, a kit, and a method of use thereof for assisting snipers or long-range shooters in arriving at a firing solution. In particular, the present teachings relate to an analog, slide rule calculator which is capable of calculating vertical and horizontal (elevation and windage) trajectory compensation for a telescopic sight or other aiming system by compensating for the net/true density of the air, known as density altitude.

BACKGROUND OF THE INVENTION

There are several known tools for assisting snipers or long-range shooters in arriving at a firing solution. A firing solution can be seen as the result of a series of complex mathematical equations that a shooter can perform to arrive at an appropriate elevation and windage adjustment for a target at a given distance.

Known software-based tools currently used by shooters in the field are referred to, or commonly known as, ballistic computers and/or ballistic calculators. They can function within a full-size computer, handheld computer, PDA, mobile phone, and the like. Ballistic computers require the shooter to enter precisely gathered data referring to the specific attributes of a system which is to be fired, in addition to atmospheric data, such as air temperature, barometric pressure, altitude, humidity, and the like.

Ballistic computers and associated ballistic programs rely upon these precisely gathered and entered variables to compute an accurate measure of the true or "net" air density, commonly known as density altitude. Computing the density altitude allows them to predict the amount of vertical and horizontal compensation required to fire a projectile through a given measure of air density or "density altitude" at targets of varying distances. Known ballistic computers can provide highly accurate firing solutions but include significant disadvantages as they are battery-powered, software-driven, and are subject to fail in harsh environmental conditions due to loss in battery power, rough handling, or various other reasons. Software-based ballistic computers and programs are complex in nature and require the user to have an advanced understanding of exterior ballistic science and associated theories, thus requiring the user to continually practice using the program in order to maintain proficiency in its efficient and effective use. This complexity is not advantageous to military snipers operating under stress and time constraints found in combat environments and situations. Ballistic computers can also be costly to purchase, update, repair, and can take up valuable space in a shooter's pack and/or add weight to an already heavy load commonly carried in austere combat conditions.

Other known non-software based tools currently being used by shooters include analog slide-rule type devices. These tools allow a shooter to compute the distance to the target as well as a rough firing solution based off of a ballistic chart, see for example, U.S. Pat. No. 5,960,576 and U.S. Pat. No. 6,196,455. However, such known analog-type devices are flawed in that they do not determine a firing solution by compensating for the current value of density altitude in which the fired projectile is to travel through. Instead, they operate by using a fixed and standardized air density value, commonly known as Standard Atmospheric Conditions, or another set of preset and fixed atmospheric conditions. As a result, known analog-type devices do not allow a shooter to make adjustments based upon the current density altitude nor can they make adjustments as the density altitude value changes. By not compensating for the current density altitude, known non-software based tools experience a significant loss of accuracy when determining a firing solution across a wide range of environmental conditions.

Another known non-software based tool currently used by shooters is a reticle system. This known system includes a density altitude measurement graph that is incorporated as part of the reticle within the scope of the firearm, see for example, U.S. Pat. No. 7,748,155. In use of this system, the user estimates the density altitude using the graph within the scope and then selects a corresponding aiming point on the reticle that provides appropriate trajectory compensation for a bullet fired at a specific muzzle velocity. The reticle system is only functional to the user if the user has in their possession a scope that has the proprietary aiming system built into the internal lens system. This aiming system is also fixed within the scope of the firearm and requires the user to possess ammunition that has a muzzle velocity that matches the calibration of both the reticle and the aiming system within the scope.

Accordingly, there exists a need for a simple and reliable tool for assisting snipers or long-range shooters in arriving at very accurate firing solutions by compensating for the actual measure of air density being fired through. Such a tool should be usable with any type of firearm sight, scope, or aiming system and capable of being tailored to a user's specific equipment performance parameters. There also exists a need for a tool which is small, affordable, and extremely resilient to rough handling and harsh environmental conditions, while not requiring a source of power, such as batteries or a power outlet, or forming a part of the firearm sight, scope, or aiming system.

SUMMARY OF THE INVENTION

The present teachings provide a stand-alone apparatus that can provide a firing solution for a scope of a firearm. The apparatus can include a housing having a viewing area. The apparatus can also include a slide having a matrix of firing solutions printed thereon based on a plurality of density altitude values. The slide can be movable with respect to the planar housing such that a portion of the matrix of firing solutions is viewable in the viewing area of the housing based on a density altitude value.

The present teachings also describe a kit for determining a firing solution for an aiming system of a projectile firing device. The kit can include a housing having a viewing area and a plurality of slides. Each slide can include a matrix of firing solutions printed thereon based on a plurality of density altitude values. Each matrix of firing solutions can be specific to a bullet type and a muzzle velocity of a different projectile firing device. Each slide can be individually movable with respect to the housing such that a portion of the matrix of firing solutions is viewable in the viewing area of the housing based on a particular density altitude value.

The present teachings further describe an apparatus for determining a firing solution for an aiming system of a projectile firing device. The apparatus includes a slide including a matrix of firing solutions printed thereon based on a plurality of density altitude values and a plurality of ranges to a target. The matrix of firing solutions is configured so as to be at least partially viewable in a viewing area of a housing as the slide is moved with respect to the housing.

The present teachings still further describe a method of determining a firing solution for an aiming system of a projectile firing device. The method includes providing a housing including a viewing area and choosing a slide specific to a particular bullet type and muzzle velocity of the projectile firing device. Each slide can include a matrix of firing solutions printed thereon based on a plurality of density altitude values. The method further includes determining the current density altitude and moving the slide with respect to the housing until the current density altitude value appears in the viewing area of the housing along with the corresponding portion of the matrix of firing solutions. The user can then select an appropriate firing solution for a desired range to target.

The present teachings additionally further describe a method of determining a firing solution for an aiming system of a projectile firing device to be fired. The method includes providing a plurality of slides, each slide being specific to a bullet type and muzzle velocity of a different projectile firing device. Each slide includes a matrix of firing solutions printed thereon based on a plurality of density altitude values and a plurality of ranges to a target. The method further includes choosing a slide specific to a particular bullet type and muzzle velocity of the projectile firing device to be fired. The method also includes determining a current density altitude value and determining a range to a desired target. Lastly, the method includes selecting an appropriate firing solution on the chosen slide based on the current density altitude value and the range to the desired target.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

FIG. 2C shows the first side of an interchangeable slide useable with the first embodiment of the apparatus according to the present teachings;

FIG. 2D shows the second side of the exemplary interchangeable slide of FIG. 2C according to the present teachings;

FIG. 3C shows the first side of an interchangeable slide useable with the second embodiment of the apparatus according to the present teachings; and FIG. 3D shows the second side of the exemplary interchangeable slide of FIG. 3C according to the present teachings.

Figure 1:
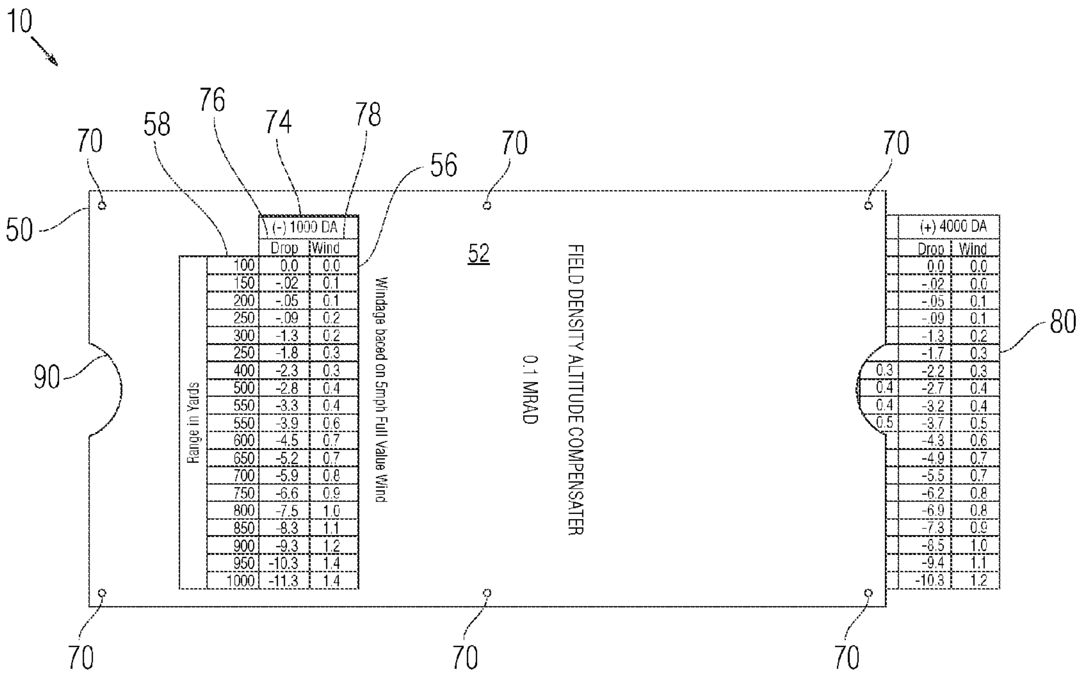
FIG. 1 shows a front view of the apparatus of the present teachings in use according to various embodiments.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings relate to an apparatus for use by sportsmen, military personnel, law enforcement personnel, and others that are equipped with firearms or other projectile firing devices having telescopic sighting systems, rifle scopes, or other aiming systems for firing projectiles at targets of varying distances through varying atmospheric conditions. The telescopic sight could be mounted upon a high-powered rifle but the present teachings can find alternative uses with telescopic sights attached to other types of firearms.

The apparatus is a stand-alone device that is useable in the field for simply, rapidly, and accurately calculating ballistic trajectory corrections, commonly known as 'elevation' and 'windage' firing solutions. The apparatus can calculate firing solutions for any type of telescopic sight, scope, or aiming system by using density altitude values to adjust the trajectory compensation necessary for firing at various distances. The apparatus allows firing solutions to be tailored to a user's specific equipment performance parameters and can be quickly changed when employing different equipment having other performance parameters. Being a stand-alone device, the apparatus of the present teachings is not a part of and is unassociated with the telescopic sight, scope, or aiming system it can calculate a firing solution for.

A firing solution is a numerical expression containing at least: i) a 'bullet drop', 'drop', or 'elevation' value, and ii) a 'wind' or 'windage' value. These two values relate to common terms used among long-range shooters and manufacturers of telescopic sights to provide vertical and horizontal (elevation and windage) trajectory compensation for a telescopic sight. 'Bullet drop' or 'drop' is the amount of vertical angular elevation needed to fire a projectile to a distant target in order to defeat gravity and atmospheric drag. The more distant a target, the more 'drop' there is to compensate for in order to reach the target with the projectile. 'Windage' or 'wind' is the amount of horizontal angular offset required to fire a projectile to a distant target in order to defeat an existing crosswind between the shooter and the target. Other values making up a firing solution can include 'angle' and 'lead' and these values will be discussed later in more detail below.

Density altitude can best be understood as the true or "net" density of the air. Density altitude is a computation that utilizes temperature, altitude, barometric pressure, and humidity to arrive at a single FIGURE representing the holistic 'density' of the atmosphere. Knowing the current density altitude value is useful to long-range precision shooters and snipers because it provides them with a single number representation of air density that must be compensated for prior to firing at a distant target. Air having a greater density altitude imparts less drag or deceleration on a projectile in flight, causing a projectile to impact higher on a target than when fired in air having a lesser density altitude.

The apparatus of the present teachings can provide firing solutions for any current measure of density altitude as encountered by a user prior to firing at a distant target. As such, the apparatus allows the user to compensate for the actual density altitude to be fired through, thereby substantially increasing long-range accuracy and first shot hit probability.

Referring to FIG. 1, the apparatus 10 of the present teachings can be an analog, slide rule calculator that includes an external case or housing 50 and one or more interchangeable slides 80 that can slide within the case 50. Each interchangeable slide 80 can include a matrix of firing solutions printed on at least one side thereof. The external case 50 can include a first, front housing shell 52 and a second, back housing shell 54 (not shown in FIG. 1) which can be secured together by way of attachment elements 70. The front housing shell 52 and the back housing shell 54 can be planar and can be arranged to allow a slide 80 to be sandwiched therebetween in a manner that allows relative motion between the slide 80 and the housing shells 52, 54 while not allowing the slide to easily fall out of the case 50 during use. The attachment elements 70 can be metallic eyelet rivets or any other securing mechanism as would be appreciated by one of ordinary skill in the art.

One or more of the ends of the housing shells 52, 54 can include recessed cuts or pull tabs 90. The pull tabs 90 allow the user to easily grasp and manipulate the position of the slide 80 within the case 50. The pull tabs 90 can also assist a user when removing and inserting other slides 80 into the apparatus 10 and when cleaning debris from the inside of the case 50. As will be discussed in more detail below, the apparatus 10 includes ruled scales which can be slidably manipulated to perform calculations as is reminiscent of a slide rule.

Figure 2A:
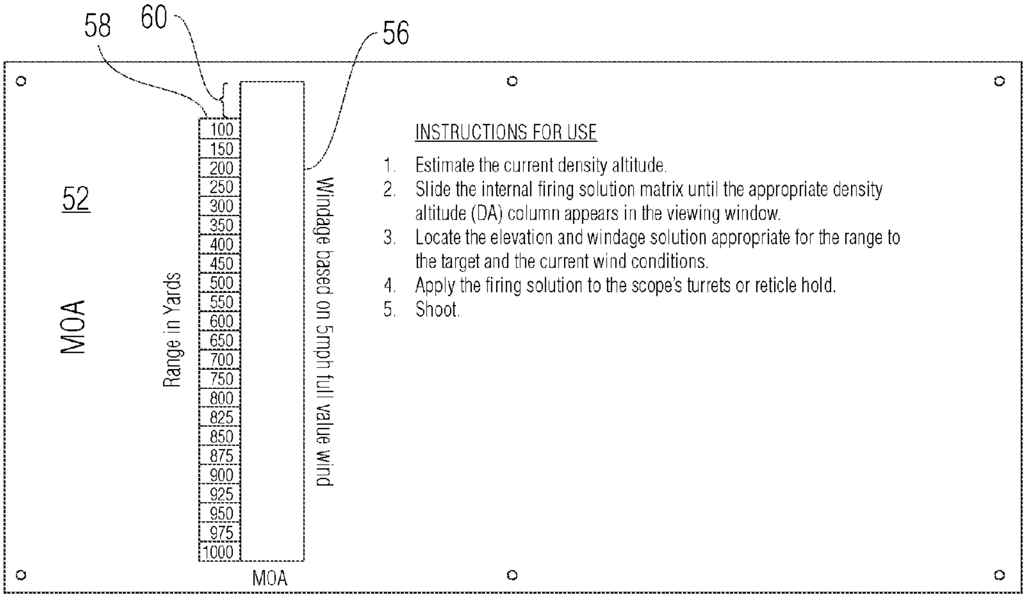
FIG. 2A shows a front housing shell of a first embodiment of the apparatus of the present teachings.
Figure 2B:
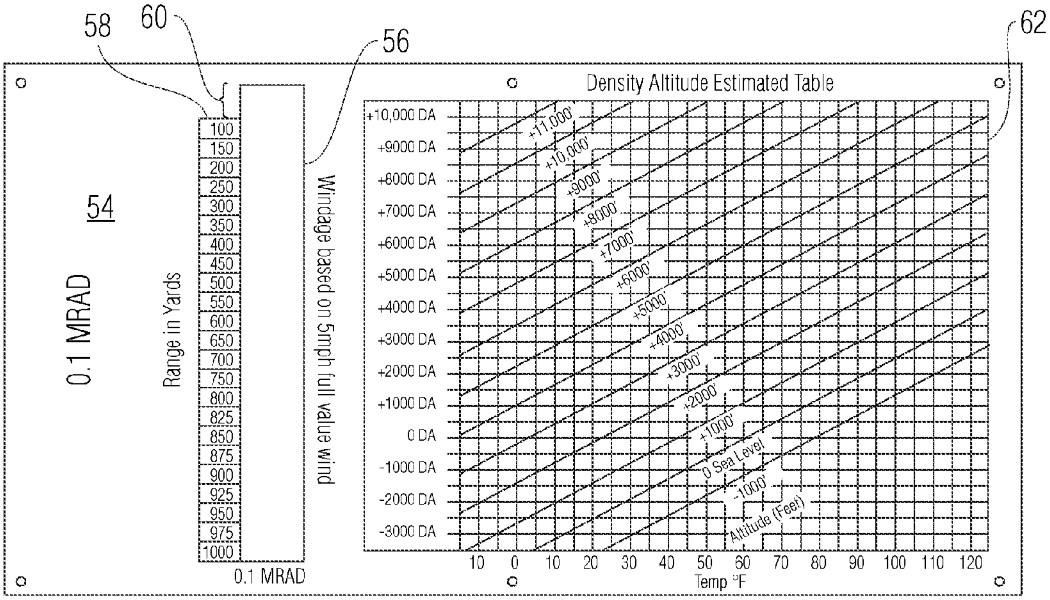
FIG. 2B shows a back housing shell of the first embodiment of the apparatus of the present teachings.

FIGS. 2A and 2B show the first front housing shell 52 and the second rear housing shell 54, respectively, which together form the casing 50. Each of these housing shells 52, 54 can include a viewing area or a cut-out window 56. Along a side of each viewing area 56, a range column 58 can be provided which includes a series of printed distances to a potential target. As shown in FIG. 1 and as will be more fully discussed below, a slide 80 can be slid between the housing shells 52, 54 until the current density altitude value printed on the slide 80 is visible in a top portion 60 of the viewing window 56. Knowing the approximate distance to a desired target, the user can look down the range column 58 and readily determine the accurate firing solution values ('Drop' and 'Wind') as displayed in the viewing window 56 and printed on the slide 80 (as shown in FIGS. 2C and 2D).

The range column 58 can include a column of distances. For example, the range of distances can be from 100-1500 yards, or more. The listed range can be in yards (or in any other units) and can increase in increments up to a certain point. For example, the listed ranges can increase in 50 yard increments up to 800 yards. After that certain point, all range increments can be listed in smaller increments, providing the user with a much more refined firing solution for very distant targets (for example, greater than 800 yards). For example, from 800-1,000 yards all range increments can be listed in 25 yard increments.

Referring now to FIGS. 2C and 2D, first and second sides, respectively, of an exemplary interchangeable slide 80 for use with the housing shells 52, 54 of FIGS. 2A, 2B are shown. The interchangeable slide 80 can include a planar sheet of material having a matrix of firing solutions 72 for various density altitudes 74 and target distances printed thereon (each horizontal row of cells representing a distance to a target and aligning with the range column 58 printed on the first front housing shell 52). Each firing solution can include a drop value 76 and a wind value 78. The matrix 72 of firing solutions can be printed on one or both sides of the slide 80.

According to various embodiments, the apparatus 10 of the present teachings can be arranged as a kit that includes a plurality of interchangeable slides 80 which can be swapped out of the case 50 by the user. The matrix of firing solutions 72 printed on a slide 80 can be arranged in a common, standardized format (for example, having a standardized cell size and font) allowing the slides 80 to be interchangeable within one or more cases 50, which also include a standardized size having a standardized viewing window 56.

Each slide 80 can be specific to a particular caliber, bullet type, muzzle velocity, ballistic coefficient, or sight/optical offset specific to the firearm, sighting system, and ammunition to be fired. Muzzle velocity is the speed that a projectile exits the muzzle of a firearm, commonly measured in feet per second (fps). For example, each slide can contain ballistic data specific to the most common velocity range used with the 175 Siena Matchking (2600, 2650, 2700 fps). According to various embodiments, slides 80 can be custom-made to exactly match the equipment used by a person or entity, such as the ammunition used by a particular military organization. By interchanging slides 80, a user can tailor the apparatus 10 to the specific equipment performance parameters being used at that time.

The matrix of firing solutions 72 (table of drop and wind values) printed on the slides 80 has been calculated using a drag model and an associated and commonly accepted ballistic coefficient. The data contained on the slides 80 are the result of an extensive live fire testing and validation project involving military snipers, various different weapon/optic combinations, and thousands of rounds of ammunition of varying types with varying attributes and performance parameters, that has been fired in numerous environments around the world.

'Wind' values 78 printed on the slides 80 can be based on a fixed wind velocity, for example; a 5 mph full value "baseline" wind or a wind of another speed that is easily increased or decreased by the user by means of rapid and simple multiplication or division. This allows a user to readily multiply or divide this baseline as winds increase or decrease in velocity, or if the wind value (wind angle) changes from perpendicular to the axis of fire (which would be a full value wind).

The interchangeable slides 80 and the housing shells 52, 54 can be formed of impact resistant materials. Such materials can include plastic, such as polyvinyl carbonate (PVC) and the like. The slides 80 and housing shells 52, 54 can be completely waterproof and can be designed to sustain conditions that a sniper would experience when operating in the field.

As shown in FIG. 2A, the first housing shell 52 of the case 50 can be marked so that it can be used to calculate firing solutions in angular units of measure known as MOA (minutes of angle). Similarly, as shown in FIG. 2B, the second shell 54 of the case 50 can be marked so that it can be used to calculate firing solutions in angular units of measure known as 0.1 MRAD (one tenth milradian, commonly referred to as "mils"). MOA and mils are angular units of measure commonly used to adjust the internal mechanisms of modern optical systems associated with firearms or other projectile firing systems.

Similarly, as shown in FIGS. 2C and 2D, the matrix of firing solutions printed on one side of a slide 80 can be in MOA and the matrix of firing solutions printed on the other side of the slide 80 can be in MRAD. On either side of the slide 80, the matrix of firing solutions can be printed for the same range of density altitude values 74. For example, as shown in each of FIGS. 2C and 2D, the density altitude values 74 can range from −3 k to +10 k.

By marking each of the housing shells 52, 54 and the sides of the slide 80 with different units, the user can readily switch unit systems by simply flipping the apparatus 180° and adjusting the position of the slide 80 so that the proper current value of density altitude is shown in the top portion 60 of the viewing window 56. By incorporating different units of measure, the apparatus 10 can be used with any telescopic sight, scope, or aiming system in popular use around the world.

To ensure that a user has inserted a slide 80 into the case 50 properly so that consistent scope adjustment increments (MOA/0.1 MRAD) are being viewed both on the respective housing shell 52, 54 and on the slide 80, the surfaces of each can be color-coded. For example, the surfaces can be color-coded so that if the color of the exposed face of the slide 80 as seen through a viewing window 56 and the color of the corresponding housing shell 52, 54 match, then it can be confirmed that the slide has been properly inserted. Alternatively or in addition, markings can be provided on the slide 80 which can be matched with markings on the housing shell 52, 54.

As shown in FIG. 2B, the second housing shell 54 can also have a density altitude calculation table 62 printed thereon, but such a table could be printed on either side thereof. The density altitude calculation table 62 is a nomograph that can be used to allow a user to readily compute density altitude with acceptable accuracy in the absence of a more complicated instrument, such as a weather meter (e.g. Kestrel 4000) or other device that measures density altitude. In order to use the density altitude calculation table 62, the user must have a reasonably accurate estimation of the current physical altitude and the temperature.

According to various embodiments, the sonic barrier can be marked in red (or in any other differentiating color, boldness, and the like) on each slide 80 as generally shown at 64 in FIGS. 2C and 2D. Such a marking is used to indicate the point at which a projectile will begin and maintain sub-sonic flight at a given density altitude, target distance, and muzzle velocity. This can be very helpful for shooters that are engaging long-range targets in relatively dense air in which the projectiles could become unstable and possibly unpredictable in flight.

The apparatus 10 can be sized for convenient use in the field. The case 50 is suited for easy two-handed manipulation, and thus can be from about 2.0 to about 4.0 inches wide, from about 3.5 to about 7 inches long, and as thin as possible, although these dimensions are by way of example rather than limitation. The slide 80 should also be from about 2.0 to about 4.0 inches wide, from about 3.5 to about 7 inches long, and as thin as possible. Preferably, the case 50 should be about 3.78 inches wide and about 6.625 inches in length, while the slide 80 should be about 3.26 inches wide and about 6.625 inches in length. Accordingly, the length, width, and thickness of the apparatus 10 permits it to ideally be handheld, stowable in a vest or pants pocket, or in a small exterior pocket on a knapsack or backpack when not in use.

The use of the apparatus 10 of the present teachings will now be described. First, the user selects the slide 80 that most closely matches the projectile type and muzzle velocity of the firearm to be used. This closely tailors the pre-calculated ballistic information on the slide 80 to the user's actual equipment.

A firearm's muzzle velocity can vary based on the temperature of the gunpowder contained in the ammunition to be fired. As a result, the selection of the proper slide 80 by the user is based on the approximated temperature of the ammunition to be fired and the barrel length of the firearm. As the temperature of the gunpowder increases or decreases (due to exposure to external hot or cold temperatures), the muzzle velocity increases or decreases. Hotter gunpowder burns faster, resulting in higher pressure within the firearm and faster muzzle velocity. Colder gunpowder burns slower, resulting in lower pressure within the firearm and slower muzzle velocity.

Another variable which affects the muzzle velocity of a firearm is the barrel length. Generally speaking, a firearm with a longer barrel will produce a greater muzzle velocity compared to a firearm with a shorter barrel. This increased velocity occurs in longer barreled firearms due to the projectile remaining in the barrel for a greater length of time and the forces of pressure which act to accelerate the velocity of a projectile for a greater amount of time while the projectile (or bullet) is traveling down the barrel. The reverse is true when firing a projectile out of a relatively shorter barrel, as a decrease in muzzle velocity generally occurs. Using the specified and published velocity that the ammunition to be fired should produce, combined with the knowledge of the velocity that a particular firearm barrel should produce, as well as the effect of varying ammunition temperatures have on the specified ammunition to be used, the user can reasonably predict the velocity of the projectile exiting the barrel. With this information, the user can then select the appropriate slide 80 to be used within the case 50.

The selected slide 80 is then inserted into the case 50. The user then estimates the current density altitude using the density altitude estimation table 62 printed on one of the sides of the housing shells 52, 54. Alternatively, the user can measure the current density altitude with a weather metering instrument.

Based on the current measure of density altitude, the user moves the slide 80 until the density altitude value 74 is visible in the top portion 60 of the viewing window 56 of the housing shell 52, 54. The pre-calculated firing solutions corresponding to the measured density altitude value 74 then align below the density altitude value 74 in the viewing window 56. By knowing the distance to the target and finding that value on the range column 58, the user can determine the appropriate firing solution (e.g. drop value 76 and wind value 78). These values 76, 78 can then be applied to the elevation and windage turret of the firearm's telescopic sight or the user can select an appropriate elevation and windage holdover and/or offset to provide the proper trajectory for targets at varying distances. When ready to shoot, the user selects an aiming point on the desired target (a desired point of impact) using the telescopic sight and then fires the firearm at the target.

Referring now to FIGS. 3A-3D, another embodiment of the apparatus 110 is shown. This apparatus 110 not only provides the necessary elevation and windage compensation (i.e. a drop value 176 and a wind value 178) needed for firing at targets at varying distances by moving a slide 180 until the current density altitude value printed on the slide 180 is visible in a top portion 160 of the viewing window 156, but also provides compensation for firing at targets at uphill or downhill angles, as well as compensation for a target that is moving laterally. This provides the shooter with a lead to strike a moving target at a given speed (the speed of the target).

Figure 3A:
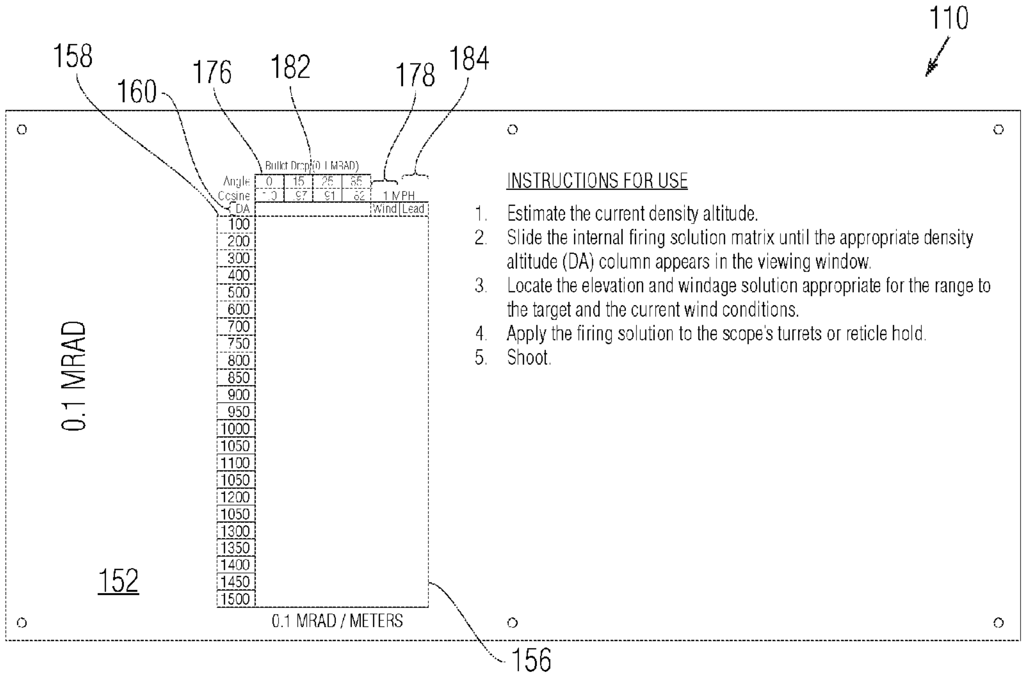
FIG. 3A shows a front housing shell of a second embodiment of the apparatus of the present teachings.
Figure 3B:
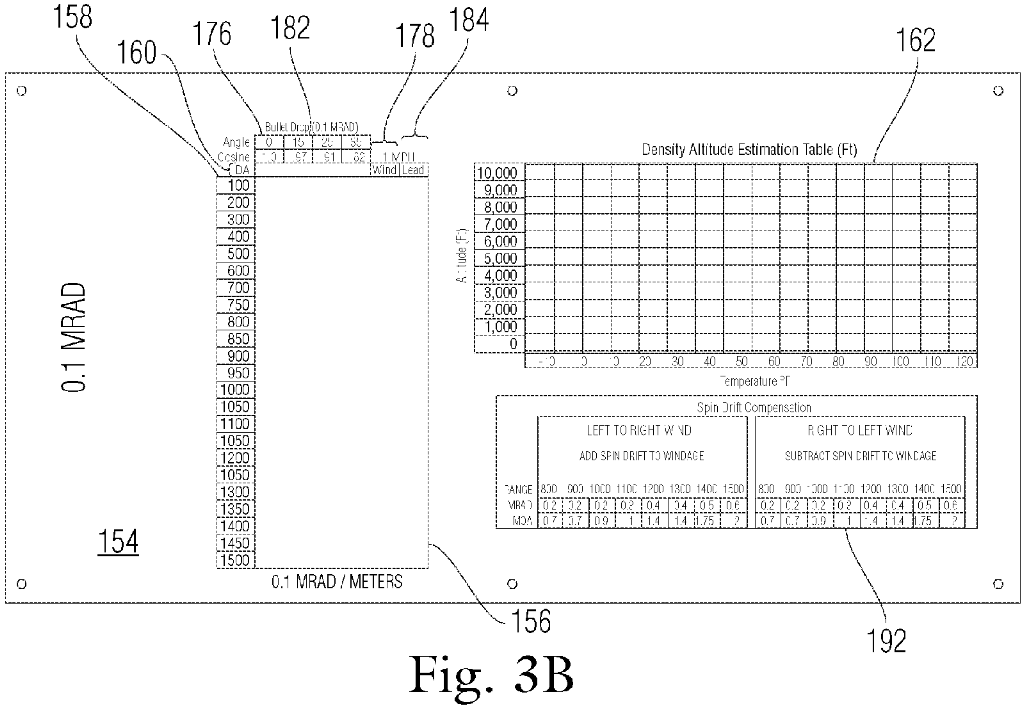
FIG. 3B shows a second housing shell of the second embodiment of the apparatus of the present teachings.

FIGS. 3A and 3B show a first front housing shell 152 and a second rear housing shell 154, respectively, of the second embodiment of the apparatus 110. The corresponding viewing window 156 in each shell 152, 154 can be made wider in order to allow viewing of additional columns of numbers that have been pre-adjusted for firing at angles of 0°, 15°, 25°, and 35°. It is noted that firing at an angle of 0° (see reference number 176 in FIG. 3A) corresponds to the drop value 76 of the apparatus 10 of the first embodiment. This additional data 182 (i.e. angle value) for 'angle' compensation allows the user to have an instant, ready-made computation of the exact firing solution needed for firing at an angle. Firing projectiles at upward or downward angles will always produce a higher impact if not compensated for. The compensation provided by the additional data requires the user to measure the firing angle and then use an associated cosine to reduce the firing solution, thereby compensating for the upward or downward angled shot. Every angle from 0° to 90° has an associated cosine which can be applied to a firing solution. These cosines will always be numbers less than 1.

As also shown in FIGS. 3A and 3B, an additional column has also been provided for 'lead' (i.e. a lead value 184) which provides data for firing at a moving target. Firing projectiles at a moving target is a complicated endeavor. The user must be able to approximate the speed that the target is moving and calculate an appropriate "lead" for the moving target. The 'lead' provides enough time for a moving projectile to begin its travel toward a moving target. The projectile is actually fired in front of the moving target and due to the target's speed and time of flight of the projectile, the projectile and the target will intersect paths if the proper 'lead' is applied.

The apparatus 110 provides a lead value 184 in 1 mph increments which reference a 1 mph speed of target movement. The associated lead value 184 with the 1 mph target can readily be multiplied by the user if the target increases or decreases its speed during firing preparation. So, if at 500 meters a 1 mph moving target needs a 0.7 mil lead, and if the target increases its speed to 3 mph, then the user simply needs to increase the lead to 2.1 mils, multiplying the original 1 mph lead by 3 (e.g. 0.7×3=2.1).

The 'wind' values 178 printed on the slides 80 used with apparatus 110 can be based on a fixed 1 mph full value "baseline" wind that can be easily increased or decreased by the user by means of rapid and simple multiplication or division, as discussed above.

The involved variables with firing at moving targets are listed below: distance to target, time of flight to the target, air density, wind compensation, firing angle (up or down), target speed.

In the second embodiment of the apparatus 110, these variables are all pre-calculated and isolated in the viewing window 156 for a user-selected density altitude 174, see FIGS. 3C and 3D which show first and second sides of a slide 180 for use with apparatus 110. Once the user slides the appropriate density altitude column 174 into the top portion 160 of the viewing window 156, all variables needed to fire at targets that are stationary, moving, at up/down angles, and involving wind between the shooter and the targets location are completely pre-calculated and ready to apply to a telescopic sight or any other aiming system associated with projectile firing systems.

As shown in FIGS. 3C and 3D, the adjustments are shown in MRAD on both sides of the slide 180. In FIG. 3C, the matrix of firing solutions is shown for density altitude values of from −2 k to +6 k on the first side of the slide. In FIG. 3D, the matrix of firing solutions continues and are shown for density altitude values of from +8 k to +16 k on the second side of the slide. By only using MRAD, the apparatus 110 can be seen more as a military version since the use of MRAD by the average civilian recreational shooter is only recently becoming popular. However, the apparatus 110 could be designed for use in MOA, or other angular units of measure.

As in the other embodiment, the sonic barrier can also be marked in red (or in any other differentiating color, boldness, and the like) on each side of the slide 180 as shown at 164.

As shown in FIG. 3B, the apparatus 110 can also have a density altitude calculation table 162 printed on the second rear housing shell 154. However, the density altitude calculation table 162 of apparatus 110 can provide density altitude values up to 15,500' DA versus 10,000' DA for apparatus 10.

In addition to the density altitude calculation table 162, a spin drift compensation table 192 can be printed on one of the housing shells 152, 154. Spin drift is a commonly used term to describe what is known as 'spin gyroscopic precession' or 'gyroscopic precession', and is commonly referred to as the 'Magnus Effect'.

Spin drift is caused when the grooves of a rifled barrel (modern rifles have 'rifling' which are groves that are cut into the interior of the barrel) force a bullet to spin down the barrel before exiting and flying to a target. Once the projectile leaves the barrel, this spin is maintained across the flight of the projectile to the target. Some barrels have a faster or slower rate of twist (rate of rotation) which imparts a faster or slower RPM to the bullet as it spins around its longitudinal axis in flight. Just as a football player throws a spinning football, this spin imparted on the projectile dramatically improves the stability and long-range accuracy of the projectile.

Spin drift occurs when a clockwise spinning projectile exiting a rifled barrel begins to drift, skid, or walk its way directly to the left or right in relation to its direction of rotation (e.g. a clockwise rotation will cause a rightward drift). This small degree of drift (i.e. gyroscopic precession) increases as the projectile travels farther. The gyroscopic precession is angular from the original intended horizontal point of aim. Spin drift is directly affected by the RPM imparted to the bullet by the firearm's rifling and the direction of rotation imparted by the rifling (clockwise or counter-clockwise).

The spin drift compensation table 192 is used after a user has formed a firing solution by selecting the correct drop and wind values as referenced through the viewing window 156. The user then references the spin drift compensation table 192 and appropriately adds or subtracts from the wind value depending on the direction of the present wind that the projectile will be fired through. The spin drift compensation table 192 can provide corrections which begin, for example, at 800 meters or less, and can continue to, for example, 1500 meters or greater, for all calibers and bullet types to be used with the apparatus 110. The values listed in the spin drift compensation table 192 can be in MOA and/or in MRAD.

The user can conduct a quick mental adjustment of the wind value of the firing solution by referencing the spin drift compensation table 192 adjacent to the viewing window 156 and then applying this compensated firing solution to the aiming system. As a result, the final settings that the user generates are firing solution values which include the compensation necessary to correct for the spin drift effect on the projectile's travel to the target.

The apparatus 10, 110 of the present teachings requires no batteries, weighs only a few ounces, is small enough to be carried comfortably in a shirt or pants pocket, and is extremely resilient to rough handling and harsh environmental conditions. The apparatus 10, 110 can be used as a backup to a modern ballistic computer if the ballistic computer is damaged by water or rough handling or runs out of batteries.

Those skilled in the art can appreciate from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. An apparatus comprising:

a housing including a viewing area; and an interchangeable slide movable with respect to the housing;

a slide including an indicia representing a matrix of firing solutions printed thereon based on a plurality of density altitude values being disposed on the interchangeable slide;

wherein the interchangeable slide is movable with respect to the housing such that a portion of the indicia representing the matrix of firing solutions is viewable in the viewing area of the housing based on a density altitude value.

2. The apparatus of claim 1, wherein the indicia representing the matrix of firing solutions is based on a plurality of density altitude values and on a range of distances to a target.

3. The apparatus of claim 1, wherein the indicia representing the matrix of firing solutions printed disposed on the slide is specific to a bullet type and a muzzle velocity.

4. The apparatus of claim 1, wherein the indicia representing the matrix of firing solutions includes values for wind and drop.

5. The apparatus of claim 4, wherein the indicia representing the matrix of firing solutions further includes values for angle and lead.

6. The apparatus of claim 1, wherein the housing includes a first planar shell.

7. The apparatus of claim 6, wherein the housing further includes a second planar shell including a second viewing area, the first planar shell and the second planar shell being secured together with the slide being movable therebetween.

8. The apparatus of claim 1, wherein further comprising a second indicia disposed on the housing includes including a column of values representing distances to a target printed thereon.

9. The apparatus of claim 1, wherein the housing includes a density altitude calculation table printed disposed thereon.

10. The apparatus of claim 1, wherein the housing includes a spin drift compensation table printed disposed thereon.

11. A kit for determining a firing solution for an aiming system of a projectile firing device comprising:

a housing including a viewing area; and a plurality of slides each including an indicia representing a matrix of firing solutions printed thereon based on a plurality of density altitude values disposed thereon, each matrix of firing solutions being specific to a bullet type and a muzzle velocity of a different projectile firing device;

wherein each slide is individually movable with respect to the housing such that a portion of the indicia representing the matrix of firing solutions is viewable in the viewing area of the housing based on a particular density altitude value.

12. The kit of claim 11, wherein the indicia representing the matrix of firing solutions printed disposed on each slide is based on a plurality of density altitude values and on a range of distances to a target.

13. The kit of claim 11, wherein the indicia representing the matrix of firing solutions printed disposed on each slide includes values for wind and drop.

14. The kit of claim 13, wherein the indicia representing the matrix of firing solutions further includes values for angle and lead.

15. The kit of claim 11, wherein the housing includes a first planar shell.

16. The kit of claim 15, wherein the housing further includes a second planar shell including a second viewing area, the first planar shell and the second planar shell being secured together such that each of the plurality of slides can be individually, movably arranged therebetween.

17. The kit of claim 11, wherein further comprising a second indicia disposed on the housing includes including a column of values representing distances to a target printed thereon.

18. The kit of claim 11, wherein the housing includes a density altitude calculation table printed disposed thereon.

19. The kit of claim 11, wherein the housing includes a spin drift compensation table printed disposed thereon.

20. An apparatus for determining a firing solution for an aiming system of a projectile firing device comprising:

a an interchangeable slide including an indicia representing a matrix of firing solutions printed disposed thereon based on a plurality of density altitude values and a plurality of ranges to a target;

wherein the indicia representing the matrix of firing solutions is configured so as to be at least partially viewable in a viewing area of a housing as the interchangeable slide is moved with respect to the housing.

21. A method of determining a firing solution for an aiming system of a projectile firing device comprising:

providing a housing including a viewing area;

choosing a slide specific to a particular bullet type and muzzle velocity of the projectile firing device, each slide including an indicia representing a matrix of firing solutions printed disposed thereon based on a plurality of density altitude values;

determining the current density altitude;

moving the slide with respect to the housing until a portion of the indicia representing the current density altitude value appears in the viewing area of the housing along with the corresponding portion of the indicia including the matrix of firing solutions; and selecting an appropriate firing solution for a desired range to target.

22. The method of claim 21, wherein the indicia representing the matrix of firing solutions includes values for wind and drop.

23. The method of claim 22, wherein the indicia representing the matrix of firing solutions further includes values for angle and lead.

24. The method of claim 21, wherein determining the current density altitude includes using a nomograph printed disposed on the housing.

25. The method of claim 21, further comprising providing compensation to the selected firing solution based upon a spin drift effect.

26. The method of claim 25, wherein providing compensation based upon a spin drift effect includes using a spin drift compensation table printed disposed on the housing.

27. A method of determining a firing solution for an aiming system of a projectile firing device to be fired comprising:

providing a plurality of slides, each slide being specific to a bullet type and muzzle velocity of a different projectile firing device and including an indicia representing a matrix of firing solutions printed disposed thereon based on a plurality of density altitude values and a plurality of ranges to a target;

choosing a slide specific to a particular bullet type and muzzle velocity of the projectile firing device to be fired;

determining a current density altitude value;

determining a range to a desired target; and selecting an appropriate firing solution on the chosen slide based on the current density altitude value and the range to the desired target.

* * * * *